US011440468B2

(12) United States Patent
Golduber

(10) Patent No.: US 11,440,468 B2
(45) Date of Patent: Sep. 13, 2022

(54) ELECTRONIC LICENSE PLATE FRAME FOR DISPLAYING STATIC AND NON-STATIC INFORMATION

(71) Applicant: Gary Golduber, San Francisco (CA)

(72) Inventor: Gary Golduber, San Francisco (CA)

( * ) Notice: Subject to any disclaimer, the term of this patent is extended or adjusted under 35 U.S.C. 154(b) by 33 days.

(21) Appl. No.: 16/635,528

(22) PCT Filed: Aug. 2, 2018

(86) PCT No.: PCT/US2018/045028
§ 371 (c)(1),
(2) Date: Jan. 30, 2020

(87) PCT Pub. No.: WO2019/028262
PCT Pub. Date: Feb. 7, 2019

(65) Prior Publication Data
US 2020/0254926 A1 Aug. 13, 2020

Related U.S. Application Data

(60) Provisional application No. 62/540,489, filed on Aug. 2, 2017.

(51) Int. Cl.
*B60Q 1/50* (2006.01)
*B60R 13/10* (2006.01)
(Continued)

(52) U.S. Cl.
CPC ............ *B60Q 1/503* (2013.01); *B60R 13/105* (2013.01); *G06F 3/1423* (2013.01); *G09F 9/372* (2013.01); *G09F 7/02* (2013.01)

(58) Field of Classification Search
CPC .......... G06F 3/1423; G09F 9/372; G09F 7/02; B60R 13/105; B60Q 1/503; G06Q 30/00
(Continued)

(56) References Cited

U.S. PATENT DOCUMENTS 6,118,426 A * 9/2000 Albert .................... G09G 3/344
345/107
7,145,068 B2 * 12/2006 Mizuno .................. G09F 9/372
84/477 R
(Continued)

FOREIGN PATENT DOCUMENTS

| WO | 2013003797 A1 | 1/2013 |
| WO | 2016014966 A2 | 1/2016 |
| WO | 2017050353 A1 | 3/2017 |

OTHER PUBLICATIONS

International Application No. PCT/US18/45028, International Search Report and Written Opinion dated Nov. 23, 2018, 6 pages.

*Primary Examiner* — Jimmy H Nguyen
(74) *Attorney, Agent, or Firm* — John C. Merchant

(57) ABSTRACT

Systems, apparatus and methods related to electronic vehicle registration and tag displays, specifically a vehicle license plate frame containing multiple low power e-paper type displays configured to replace the stickers used for vehicle registration and parking authorizations as well as provide indication of purchased parking increments and/or allow for display of advertisement or other messages. The system may also allow the display of driver or vehicle specific information such as the user's driver's license number or insurance at the request of a third party authorities such as the police. The system allows for use of a mobile computing device having software connected with the internet to access a server allowing for communication with various registrations authorities including the DMV, municipal parking authorities, and private parking authorities. Displays may be overwritten and changed depending on the location of the vehicle and need to provide display of certain authorizations.

20 Claims, 7 Drawing Sheets

(51) Int. Cl.
　　　*G06F 3/14*　　　　(2006.01)
　　　*G09F 9/37*　　　　(2006.01)
　　　*G09F 7/02*　　　　(2006.01)
(58) Field of Classification Search
　　　USPC .................................................. 345/1.1, 1.2
　　　See application file for complete search history.

(56) References Cited

U.S. PATENT DOCUMENTS

| | | | |
|---|---|---|---|
| 9,558,419 B1* | 1/2017 | Wilbert | .................... G06K 9/00 |
| 9,563,814 B1* | 2/2017 | Wilbert | .................... G06K 9/00 |
| 10,464,525 B2 | 11/2019 | Dubal et al. | |
| 2008/0238719 A1 | 10/2008 | Marchasin et al. | |
| 2010/0274693 A1 | 10/2010 | Bause et al. | |
| 2011/0264916 A1 | 10/2011 | Fischer et al. | |
| 2011/0295697 A1 | 12/2011 | Boston et al. | |
| 2013/0006775 A1 | 1/2013 | Jordan et al. | |
| 2013/0238441 A1 | 9/2013 | Panelli | |
| 2015/0283939 A1* | 10/2015 | Parkes | .................... G08G 1/052 |
| | | | 340/468 |
| 2018/0186288 A1 | 7/2018 | Batten et al. | |
| 2018/0186308 A1 | 7/2018 | Batten et al. | |
| 2018/0189912 A1 | 7/2018 | Batten et al. | |
| 2018/0190040 A1 | 7/2018 | Batten et al. | |
| 2019/0056902 A1 | 2/2019 | Batten et al. | |

\* cited by examiner ained from a governmental department that licenses users and registers motor vehicles, a parking management system that transacts with the driver reserving and obtaining parking spaces and an insurance provider that provides insurance services for the driver and motor vehicle, and the data depicted on the display is any one of vehicle registration of the motor vehicle in lieu of a license plate sticker, driver's license information of the driver, current insurance status and parking validation information of the motor vehicle. In another embodiment, the GPS system is incorporated between the server and the motor vehicle assisting with at least parking space position of the motor vehicle. In another embodiment, the parking validation information includes a time remaining allowing the motor vehicle to be valid in a specific parking space.

A method of displaying data associated with a motor vehicle and driver including the steps of connecting a server storing and executing software from a non-transient memory connected to a wide area network (WAN) and a data repository, providing at least one computerized display mounted on the motor vehicle, associating the driver with the vehicle via a mobile computerized device of the driver having an instance of the software and enabled to communicate with the server and the at least one display, and pushing the data depicted at the display from the server to the at least one display either directly or via the mobile computerized device. In one embodiment, the mobile computerized device is a mobile phone and communicates with the at least one display via a second network connected to the WAN. In another embodiment, the second network is a near field communication (NFC) network. In another embodiment, the at least one display is an electrophoretic display (EPD) and remains operational depicting information when the motor vehicle is powered off. In another embodiment, the at least one display is integrated into a license plate frame of the motor vehicle. In another embodiment, the at least one display is mounted inside the motor vehicle, clearly visible through a windshield of the moto vehicle. In another embodiment, a second computerized display is provided mounted on the motor vehicle connected to the WAN and the second network. In another embodiment, the server is part of any one of a governmental department that licenses users and registers motor vehicles, a parking management system that transacts with the driver reserving and obtaining parking spaces and an insurance provider that provides insurance services for the driver and motor vehicle, and the data depicted on the display is any one of vehicle registration of the motor vehicle in lieu of a license plate sticker, driver's license information of the driver, current insurance status and parking validation information of the motor vehicle. In another embodiment, a GPS system is incorporated between the server and the motor vehicle assisting with at least parking space position of the motor vehicle. In another embodiment, the parking validation information includes a time remaining allowing the motor vehicle to be valid in a specific parking space.

DETAILED DESCRIPTION OF THE INVENTION

In various embodiments described in enabling detail herein, the inventor provides a unique system for display of static and non-static information and interaction therewith that reduces labor and costs associated with vehicle related transactions and activities. The present invention is described using the following examples, which may describe more than one relevant embodiment falling within the scope of the invention.

Figure 1:
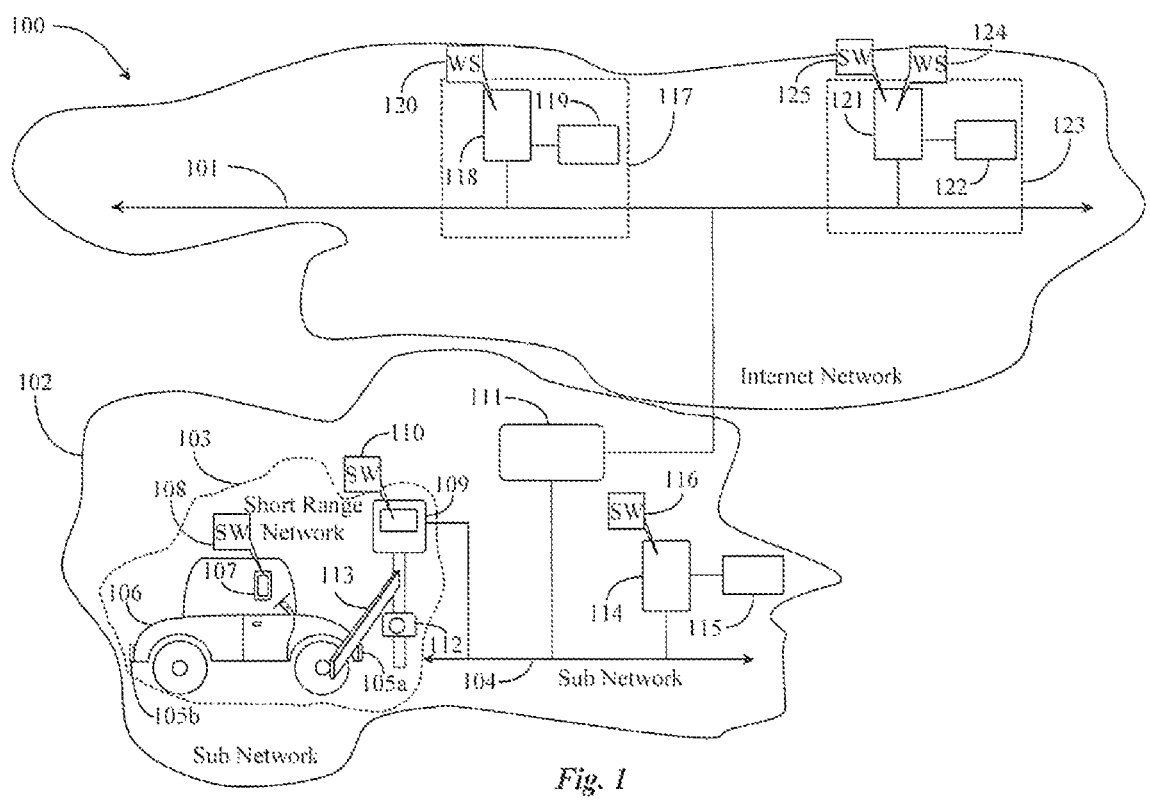
FIG. 1 is an architectural view of a communications network supporting electronic frame display of static and non-static information.

FIG. 1 is an architectural view of a communications network 100 supporting electronic frame display of static and non-static information. Network 100 includes an Internet network depicted by a network backbone 101. Network backbone 101 includes all of the lines, equipment and access points that make up the Internet network as a whole including any connected sub-networks. Therefore, there are no geographic limitations to the practice of the present invention.

Network 101 may be a corporate wide area network (WAN) or a local area network (LAN) without departing from the spirit and scope of the present invention. In this implementation, network backbone supports a web server 118 hosting a website 120. Website 120 may be operated by an enterprise, such as enterprise 117 engaged in enabling and in some cases brokering service contacts between users and third parties the users may interact with relative to vehicle registration, and other aspects of vehicle use such as parking services and or vehicle authorization for being in or for traveling to certain areas for example. Website 120 may be an access point to services for users who have purchased an electronic license plate such as a license plate frame or holder 105a or 105b depicted on a vehicle 106. In alternative embodiments, the license plate could be another device or set of devices mounted to the vehicle.

License plate frame 105a and 105b may be electronic devices capable of being remotely accessed over a network in order to command display of information in one or more display devices provided on the frame. In one embodiment, there is only one frame 105b provided at the rear of the vehicle. In another embodiment, there is only one frame 105a provided at the front of the vehicle. In still another embodiment frame 105a or frame 105b is a computing frame whereas the opposite frame is a passive display frame either connected to the active frame by wire or by wireless connection wherein the passive frame is a peripheral display frame containing only one or more electronic ink display modules also known in the art as electrophoretic displays (EPDs). A user (not illustrated) operating a mobile communications appliance such as a smart phone 107 may connect online through a sub network to the Internet in this example and may visit Website 120 after purchasing an electronic license plate frame such as plate frame 105a or 105 b. It might be assumed for purposes of discussion that one frame is required in order to practice the present invention and that frame may reside at the rear of the vehicle (typical for displaying registration information). However, alternative embodiments might have display devices (such as display screens) mounted to other areas of the vehicle such as the bumper, on the windshield or rear window, on the front of the car grill and other places clearly visible. In alternative embodiments, the alternative displays may be mounted in addition to the plate frame.

The user may download a software application (SW) from website 120 such as a SW 108 executed and running on phone 107. A purpose of SW 108 is to enable a user to interact wirelessly with plate frame 105a and or 105b via a short range wireless communications protocol such as near field communication (NFC) or Bluetooth™ protocol, for example. Other wireless communications formats may also be used such as wireless USB, or infrared (IF) for example. This capability is depicted here by a short range communications network 103. Server 118 connected to Internet backbone 101 has connection to one or more data repositories such as a data repository 119. Data repository 119 may hold website member information and account data for users who have purchased an electronic license plate frame and may register and may activate that frame for display capabilities according to embodiments of the present invention. It is also noted herein that frame 105a and or 105b may be adapted to access the Internet and communicate directly with a server on the Internet without departing from the spirit and scope of the present invention. More detail about server communications with frame 105a or 105b is provided later in this specification.

In one embodiment, the enterprise 117 operating website 120 also provides the electronic plate frames. In another embodiment, enterprise 117 may be a third party service organization and not a manufacturer or distributor of license plate frames. Network backbone 101 also supports a service organization 123 that may offer online services as well as office location services through GPS monitoring wherein GPS capability may be provided to frame 105a and or frame 105b. An example of such service organization 123 might be a department of motor vehicles (DMV) or a state park recreational service organization, or a franchise offering parking locations and parking time transaction services. Other examples could be authorities, such as police, interested in seeing the vehicle driver's license information or insurance information for the vehicle.

Organization 123 includes a server 121 having connection for communications to network backbone 101. Server 121 may be adapted to provide vehicle registration services (DMV) and the like to any users who elect to access those services online such as through a website 124. Server 121 may host SW 125. SW 125 may be a client application relative to client application 108 on user smart phone 107. In one implementation, a user operating mobile phone 107 may conduct transactions with server 121 executing SW 125 where such transactions may be relative to the user and to license plate frame 105a and or 105b. Server 121 has connection to at least one data repository 122. Data repository 122 may contain data about vehicle owners, vehicle drivers, and vehicle/driver licensing, registration and/or insurance status information including fee payment status such as might be the case if organization 123 is a DMV portal.

In this embodiment a wireless sub network 102 is depicted as a wireless sub network data carrier for wireless device communication and Internet access via such as phone 107. A user operating mobile phone 107 may access Internet 101 through a router 111. Also in this embodiment a wired sub network is depicted herein by a second network backbone 104 having connection to backbone 101 via the same router 111. Sub network 104 may be a LAN network such as an Ethernet network without departing from the spirit and scope of the present invention. Sub network 104 may be a wired network with terminals such as in a parking garage or parking lot or area having a finite number of parking spaces for paid parking services.

Sub network backbone 104 has connection to router 111 and therefore to Internet backbone 101. Sub network 104 supports a server 114 connected to one or more data repositories 115. Server 114 may be a parking transaction and space management server such as may be implemented to manage parking garage transactions and space locally. Repository 115 may contain information relative to available spaces and occupied spaces as well as license and vehicle information and identity of users patronizing the garage. Server 114 has a SW instance 116 executed and running thereon. SW 116 may be a client application relative to client application 125 and client application 108. The importance of the client applications is to make interactive transactions possible between the SW hosts in light of embodiments of the present invention.

In one embodiment license plate frame 105a and or 105b is a self-contained device that includes all of the circuitry required to receive from and transmit data to another device at least over short range communications such as Bluetooth, wireless universal serial bus (USB) protocols, or like wireless communications protocols. In this embodiment, frame 105a or 105b may include a micro controller, or computer processing unit (CPU) and a resident memory powered by battery. License plate frame 105a or 105b may include at least one electronic ink data display device for displaying data received at the license plate frame device.

In a preferred embodiment the display devices are encapsulated electrophoretic displays (EPDs). An EPD is a bi-stable display device known to the inventor that uses micro capsules of pigment that are electrically polarized in charge to produce largely static data displays including print information and image information. Other bi-stable display devices known to the inventor may also be used which are variations of electronic ink displays. Such display devices may be incorporated into frame 105b and may substitute for the traditional sticker windows now available on licenses plates.

According to one embodiment of the invention, a user operating phone 107 aided by SW 108 and driving car 106 may check availability of parking spaces and may reserve a parking spot while connected to Internet 101, server 121, and WS124 using SW 108. In this case entity 123 may be a parking garage site that receives requests for available parking ahead of arrival to a local garage. The user may purchase a space and parking time using smart phone 107 aided by SW 108. Server 121 may send a confirmation of the transaction back to phone 107, or straight to license plate frame 105a or 105b along with detailed information validating the time purchased and the space assigned or selected. The user may over short range network 103 (if not pushed directly from a server to the frame) transfer the image and text data to license plate frame 105a or 105b whereupon the information may be displayed in one or more of the available data display devices. In alternative embodiments, the user may transfer the image and text data to another screen device positioned somewhere else on the vehicle. For example, a user may transmit licensing and vehicle insurance information to a screen located on the bumper in response to a request for the same from authorities. The transmitted information may be different depending on the driver of the vehicle. For example, driving restrictions may be transferred to a display location depending on the driver of the vehicle at that time. Other driver and/or vehicle occupant information may be displayed for example disabled person's parking tag authorizations may be displayed when an individual in the vehicle is authorized to receive benefit of such tags.

The data may be displayed in a largely static fashion meaning that the data will remain in display when the car is powered off and the license plate frame is in sleep mode using minimal or no power. Information such as space location and the arrival or start time of the parking time purchased and the expiration time as well as date of parking may be displayed. The parking information purchased by the user may be forwarded to server 114 aided by SW 116 where it may be stored in repository 115 for activation when the user arrives to the garage.

Upon arrival to the garage, the user may pull up to a parking garage terminal 109 having a stop gate 113. The terminal may include a client SW application 110 relative to client applications 108, 125, and 116. Terminal 109 may include an optical detection device 112 that may detect and read any data in the display or displays that carry the parking validation and time that the user purchased and transferred to the display or displays.

Displayed information may include identity of the user, make of automobile, parking garage sector and space identification, and time slot information including start time and expiration time, vehicle driver licensing information or insurance information. With regard to display of parking information, the start time may be counted generally when the user has arrived to park the vehicle as the user may actually arrive a bit early or a bit later than the purchased time slot. An adjustment may be made at the terminal and the terminal may transfer a new start time and expiration time to license plate frame 105 over short range network 103. This information may also be transferred to user phone 107 with the aid of SW 108 to notify the user of the adjustment made.

The optical device 112 may key in on the displayed garage logo and space validation information and lift the gate bar 113 to allow the authorized driver to proceed into the garage and to the assigned or selected parking space. Other information may also be a part of the transaction such as existing disabled placard identification that may also be part of the display and may govern which parking area and space will be used.

During the time that the car is parked, the display still has the visible data including the date and expiration of the purchased time. Server 114 aided by SW 116 may monitor the actual time parked and notify a user over the Internet, (server 114 to WS 120 to phone 107) at a certain time before the expiration time. The user may then determine whether to purchase more time, which may be forwarded back to the local server 114 and applied. It is noted herein that the user may be out of range to update the new data to frame 105 so the server may handle it locally. Optical devices may also be provided to monitor individual or groups of spaces and may be used to verify that a car is still in the space after time has expired. In this event the user may be stopped on the way out to finish payment for the extra time stayed.

In another embodiment, frame 105a and or frame 105b may be adapted with a GPS location reporting module to give location and therefore presence information to a server on the Internet such as server 121. In such as case, an optical device is not needed or otherwise required to verify if a user vehicle such as vehicle 106 is in a designated parking space or approaching or at a parking area gate.

In another implementation, the system may be provided to an airport parking area, or in regular city block parking slots having meters or no meters. For example, in one implementation an electronic parking meter may be modified to practice the invention by adding an optical device for reading the display data and validating the user as the user pulls in to park. If the user has not previously purchased parking time the meter may be enabled to take payment via a short range wireless network such as network 103. In one implementation GPS may be used to guide a user to a parking space and monitor the user's time in that parking space by virtue of checking the unchanged GPS coordinates of the vehicle over time. In this case GPS reporting module may be provided to frame 105a or 105b as described further above. Another possible application is reserving parking at sports events and concerts where closer-to-event parking may be more expensive than further-from-event parking. Another possible application is allowing parking in spaces reserved for disabled persons when a user is entitled by authorities to display disabled parking authorizations.

In an implementation where GPS is used to monitor the parking state of a vehicle, a user may through application 108 on smart phone 107 set up an automated pay account with a parking service such as entity 123 in Internet backbone 101 that is accessible to server 121, which may perform parking payment transfers from the user account to pay for parking as time ensues. To accomplish this an electronic timer may be may be provided to frame 105a or 105b that may be set to run after a user parks vehicle 106 and accesses the parking service to begin the parking time. The timer may be started by the user using a remote control or a smart phone such as smart phone 107.

The act of starting the timer may cause connection over a network such as the Internet between frame 105a or 105b and a server on the Internet such as server 121 in domain 123 for the purpose of downloading from the server to the frame, electronic indicia for display into at least one of one or more EPDs on the frame. This transaction may be time stamped at the server and the server may monitor time or not because the timer on the frame is running.

At some periodic interval such as every five or ten minutes, or some other periodic interval, the server may rely on Frame GPS coordinates reported by the frame to determine if the vehicle is still parked in the original parking space. This routine may be controlled automatically by the timer. At each event the frame may report GPS location to the server and the server may thereby determine whether the vehicle is still in the parking space. This reporting requires an Internet connection that is active just for the time it takes to report the GPS coordinates from the frame device to the server. The server may deduct payment for an incremental time period from the user's credit account set up with the service.

In one embodiment, the frame provider or host operating Website 120 may employ a server to function as a proxy between a third party server like a parking transaction server and the vehicle license plate frame. The foregoing may be accomplished within a session established to report GPS from the same server, the subsequent events triggered by a finding that no funds were available in the user's credit account with the service. In one embodiment a user may enforce a cap or limit of parking time for any designated parking space that the user parks in. Users may receive notification of all of the events that might transpire between the frame and the network server to track the transactions and event while his or her vehicle is parked.

If a payment account of a user has been drawn to 0 of an amount inserted into the account to pay for parking, and the vehicle is still in the parking space as determined by GPS the server may send a message to the frame to prepare for display overwrite of information indicative of a parking violation and or no further time purchased. At this time the frame may synchronize with the server to download the information and the appropriate display module may be overwritten to display indication of violation that may be visible on the frame to a parking monitor or official. At the same time the user may be sent a notification of the state by the server to the user's smart phone wherein the user might have an opportunity to fund the tapped account with enough money for more parking time.

If there is finite amount of time that a vehicle may be parked in the designated parking space, and if that time has expired, then then the server may send a message to the frame vehicle that the frame GPS reporting session is still open with instructions to sync with the server.

In an embodiment where server 114 may be a DMV server, license plate frame device 105b may be used to display current registration data in place of a registration sticker or set of stickers. License plate frame 105b might in this case be a passive frame functioning as a display peripheral to frame 105a. In this case, frame 105b may be a client to frame 105a for display only over a wire or via a wireless communication using short range data communication.

A user may pay registration fees using phone 107 aided by SW 108 over the Internet 101 to entity 123 functioning as a DMV portal. The server may send DMV license registration information such as month and year to mobile phone 107 during or after a confirmed transaction between the server and the phone. The user may then transfer that data to frame 105a or 105b for largely static display of the confirmation and registration validation symbols text displayed on frame 105b. In one implementation frame device 105a or 105b is an Internet of things (IoT) device and may sync directly with the DMV server or a proxy server operated by the entity providing the frame and the SW without requiring the user to do so using a mobile device. In one application, colors such as those colors representing months and years may be incorporated using a color capable version of an EPD.

Still another implementation may be for users who visit national and state parks for day trips or for camping. For example, a user may purchase a camping spot that includes one or more vehicle spaces for parking. The displayed frame information may include park entrance validation symbol or text image, camping space number (if camping), and parking bay or space number, and length of planned stay. An optical device like device 112 may read the frame data when the user pulls up to the booth or GPS coordinates may be reported from a user who as arrived at the booth wherein the Frame may pass the information to the booth ranger operating a wireless computing device like a Laptop. The information may also be transferred via short range network from the user to the booth ranger and displayed on a desktop or laptop computing device. In each scenario time and work required of the user may be reduced.

While at the campsite a ranger or park worker may see the valid state displayed on a vehicle license plate frame display. A timer may also be utilized in this scenario where the timer may trigger an event such as if the timer expires meaning that the vehicle is still in the parking space after the user should have packed up and vacated wherein the frame display may be over written by the server to erase the validation display so park workers may see that. In a variation of this implementation there may be a facility on the frame that enables a peripheral single display that may be placed on a user's vehicle dashboard or the inside of the vehicle windshield that may display the frame data for easier identification by a ranger.

Figure 2:
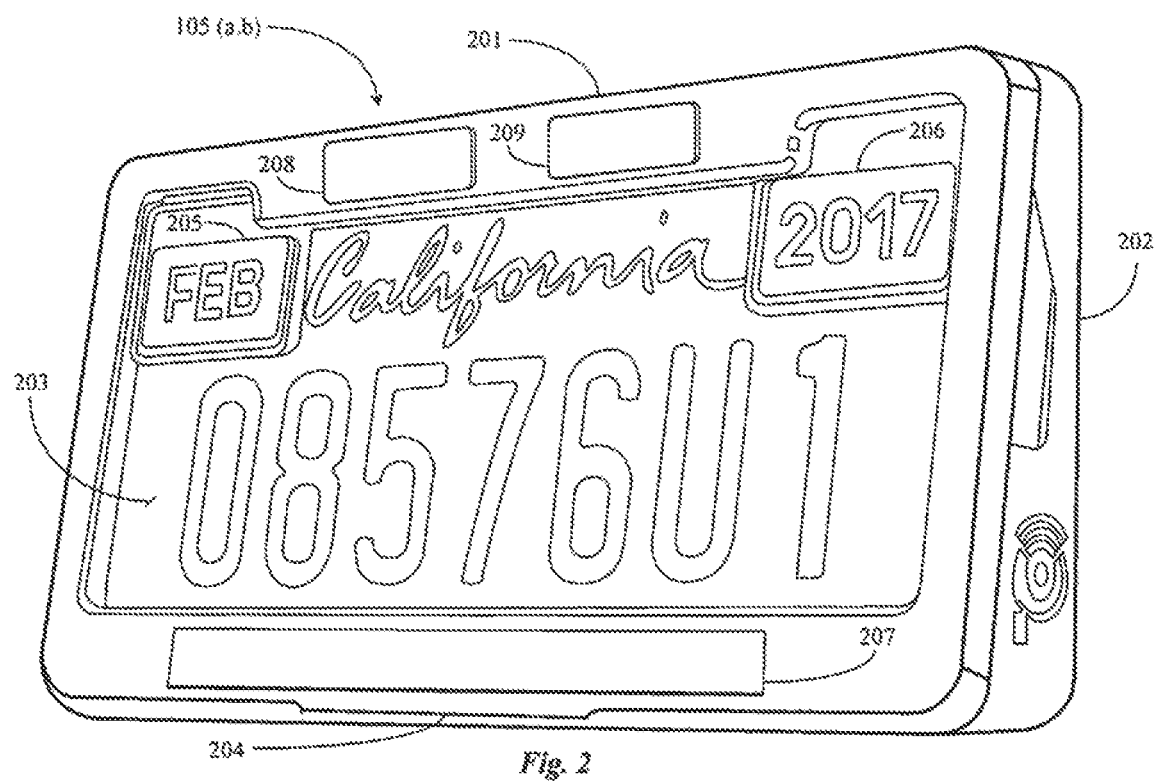
FIG. 2 is a perspective view of a license plate frame according to an embodiment of the present invention.

FIG. 2 is a perspective view of electronic license plate frame 105 (a,b) of FIG. 1 according to an embodiment of the present invention. License plate frame 105 (a,b) is, in a preferred embodiment, a self-contained unit that includes all of the circuitry required to enable at least short range communications with and at most IoT connection with and transfer of data between the frame and another electronic device connected to the short range network and within range of recognition as a network node or in the case of IoT a server on the Internet. Frame 105 (a or b) is intended to represent a frame that may be disposed on the front of or on the rear of a vehicle as described in discussion of FIG. 1. Frame 105 (a or b) also includes the required circuitry and power source to manage at least one EPD module for displaying received image and text information.

Frame 105 (a or b) may be a device molded of or otherwise manufactured (including machining) of a durable UV resistant polymer or otherwise durable weather resistant materials. Frame 105 (a or b) may be a hinged device having a front frame portion 201 and a base frame portion 202. Portion 201 and portion 202 may be hinged at the top (hinge not illustrated) so that a license plate 203 may be positioned within the frame. A lift handle 204 may be provided to enable a user to open the frame device and insert the licenses plate. In one embodiment, the frame may be closed and locked and unlocked electronically using a remote control or a smart phone device. As discussed further above, a frame may be disposed to the rear of a vehicle or to the front of a vehicle depending upon need. There may be two active frames on a single vehicle without departing from the spirit and scope of the invention. There may be one parent frame enabled for communication and one frame dedicated for EPD display wherein the second frame is a slave to the master frame that is able to connect to the network and send and receive data.

Hardware and circuitry required to enable the functions of frame 105 (a or b) may be contained within the front portion 201 of frame 105 (a or b). In this implementation there are five EPD modules integrated into the front portion of the frame. A first EPD module 205 is provided in a space on front portion 201 of frame 105 that may overlay the area on a license plate that would accept a license registration renewal sticker reflecting the month of expiration of the registration. A second EPD module 206 is provided in a space on the front portion 201 of frame 105 that may overlay the area on a license plate that would accept a license registration renewal sticker reflecting the year of expiration of the current license registration. It may be assumed that registration EPDs may be co-located on a rear frame device. Other types of data that may be displayed may be reserved for display on one or more EPDs located on a front frame device without departing from the spirit and scope of the invention. For example, insurance information and or the user's driver's license number or any other relevant information concerning the driver's authorization to drive the vehicle may be displayed. It is noted herein that there may be more than five or fewer than five EPDs integrated into license plate frame 105 (a or b) without departing from the spirit and scope of the present invention.

A third EPD module 207 is positioned at the bottom center portion of front frame portion 207. EPD 207 is an elongate display module that may be used to display electronic ink information such as the dealership where the owner purchased the vehicle. Other information may also be displayed that may overwrite the dealership logo data. In one implementation display 207 may be a single display that may be manipulated to create one or more data display windows wherein different information may be uploaded to frame 105 and then displayed in individual ones of those created windows, each window defining a boundary within which the data may be displayed.

Frame 105 includes a fourth EPD 208 and a fifth EPD 209 co-located at roughly top-center of frame portion 209. EPDs 208 and 209 may display data in addition to licenses registration data or dealership data such as vehicle authorization data to enter an area where some vehicles may be prohibited, or to drive to an area where a boundary or border must be crossed, the data indicating authorization for that vehicle to pass. Another use case might be to display data validating a campsite purchase and identifying a campsite and a parking spot or spots reserved by the user. Another use case might be to display data validating driver (or occupant) disabled person's parking authorization. Another use case might be to display information as to the vehicle driver's licensing limitations or a vehicle's insurance information.

It is duly noted herein that EPDs as are known to the inventor require very low power to operate and no power at all to continue the display of the information. There is no power requirement to refresh the screen to continue display and the only time power is required is when old data currently displayed may be overwritten by new data for display or when a timer is employed for triggering communication events to report GPS. Hence a very low power state may be reserved for timer function whereby the timer event boots the frame to a communications mode requiring more power but only for the instant session whereupon the frame may go back into a low power or sleep mode. It is also noted herein that displayed information may include but may not be limited to a symbol, text, numerical data, an image, or a combination thereof. It is also noted herein that the displayed information may be displayed in a particular color or a particular combination or set of colors.

Figure 3:
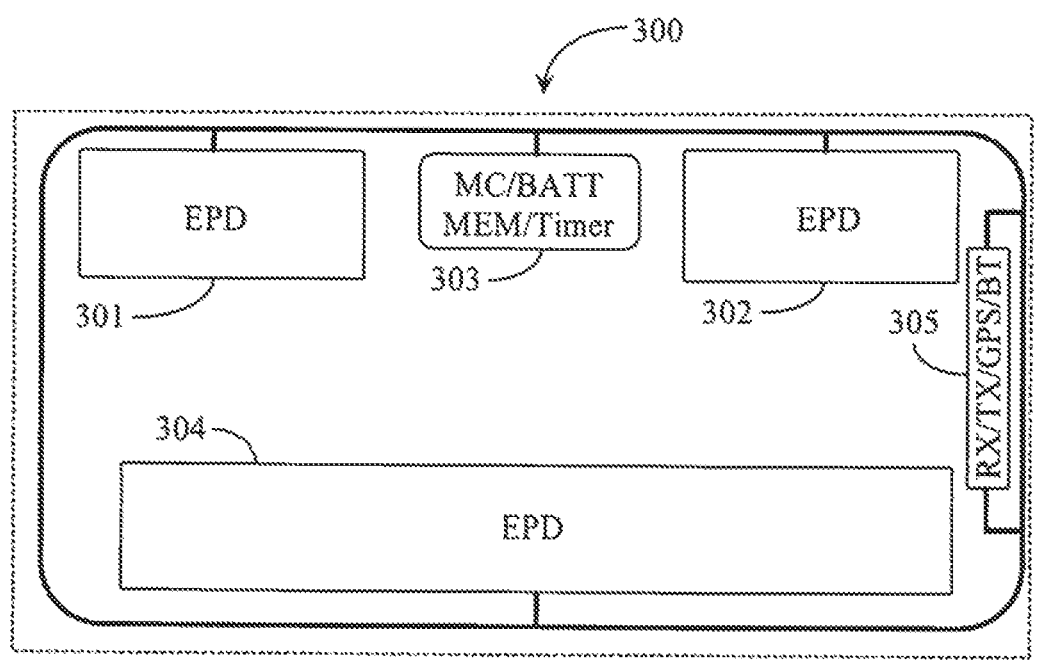
FIG. 3 is a block diagram depicting basic electronic components of the license plate frame of FIG. 2

FIG. 3 is a block diagram depicting basic electronic components 300 of license plate frame 105 of FIG. 2. Block of components 300 may include a micro controller (MC) component 303 powered by a power source in this case a battery (BATT) and having on board or otherwise having direct access to a memory (MEM). The battery may be a rechargeable battery, a solar battery or another type of power cell. Memory may include a Flash memory, an electronic queue, a cache memory or a combination of memory types such as read only memory (ROM) random access memory (RAM), and Flash memory.

Block 300 may include a power and memory bus structure bridging the separate components and display modules together for communication and power supply. Block 300 includes a communications block 305 that may include receiving (RX) circuitry regarding wireless data transmission from another device to the frame, and transmission (TX) circuitry regarding wireless data transmission from the frame to another device also known in the art as a transceiver. Block 305 may also include a blue tooth module (BT). In one implementation a wireless RF transmitter may be provided. In an IoT embodiment a wireless modem may be provided for connection to the Internet for the purpose of syncing the frame with a server and wherein the carrier network may be a digital cellular network WiFi network or other available network.

In this implementation there are three supported EPDs connected to the bus structure, EPD 301, EPD 302, and EPD 304. EPDs 301 and 302 are analogous to displays 205 and 206 of FIG. 2. EPD 304 is analogous to EPD 207 of FIG. 2. Data sent to frame 105 may be handled by controller 303, which may include SW firm ware (FW) instruction for assigning an appropriate EPD for display of specific data or indicia. Old information that may be displayed in a window may be overwritten by the new data. Once the information is displayed the frame device may send back notification to a user or system confirming the successful receipt, overwrite if required, and display of the received data.

In one embodiment, each EPD display may be separately powered and contain a micro controller wherein determination of a particular EPD for displaying information may be made by a main micro controller having bus connection to each display micro controller without departing from the spirit and scope of the present Invention. Information displayed on any of the EPDs may be transmitted to a requesting device using wireless communications. In one implementation of the present invention block 305 may include a GPS tracking module enabling a third party GPS location service to provide GPS coordinates of the vehicle relative to its location. Therefore, GPS data may be utilized by parking service organizations or municipalities to monitor the vehicle during the parking time to determine if the vehicle stayed in the parking space past expiration or left the parking space before expiration, which may affect charges to the user. In another embodiment a vehicle may be monitored by camera to determine actual parked time for the vehicle.

Figure 4:
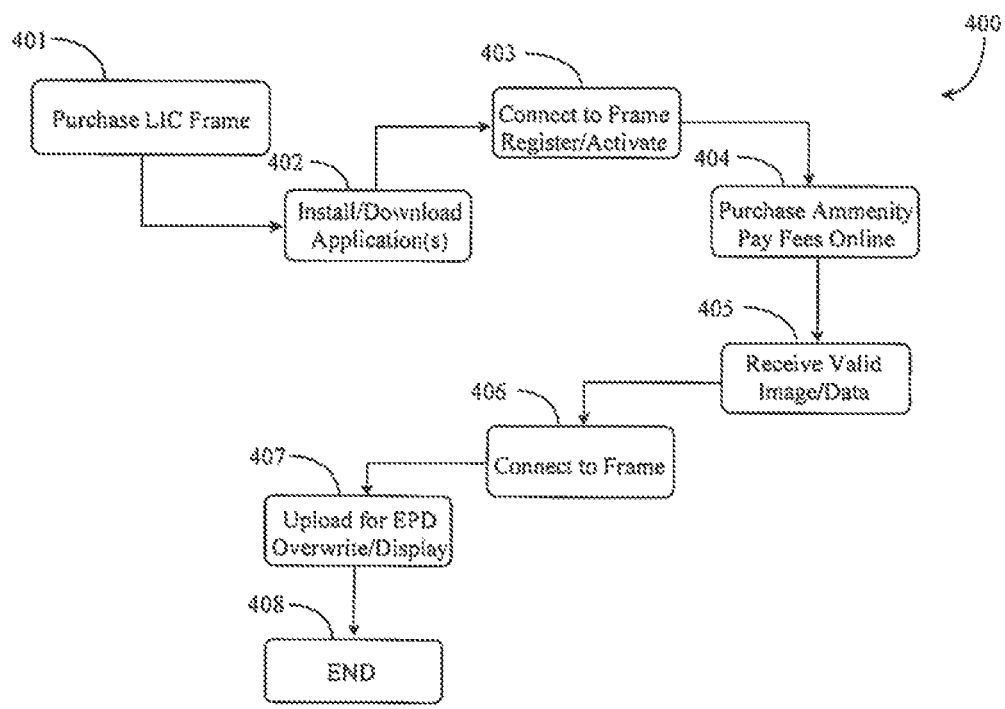
FIG. 4 is a process flow chart depicting steps for activating and using the license plate frame of FIG. 2.

FIG. 4 is a process flow chart 400 depicting steps for activating and using the license plate frame of FIG. 2. At step 401, a user may purchase an electronic license plate frame or holder from a dealership, from an auto shop or store, or from an online distributor. In one embodiment, the frame may be shipped together with a new plate to a user who is first registering a new car, for example. At step 402 the user may install after download or purchase a SW application, which enables a user to communicate and to write to the licenses plate frame using a wireless communications protocol available to the user's phone.

In one implementation, the SW may be installed and activated to the frame at the time of purchase. In another implementation, the user may acquire the SW through a website of an enterprise that may be the same enterprise providing the frames or an enterprise in partnership to develop and to provide vehicle data display services. Likewise, the SW may be provided by any third party organization that may be characterized as providing service relative to a vehicle such as a registration service, a parking service, a car rental service, a valet service, a recreational service, a security service, or the like. In one embodiment, the SW may be customized to the user's current use requirements such as using some third party service applications like car rental parking or airport parking and DMV registration services, but not recreational camping service for example. In one embodiment, the SW may be customized to provide authorizations relative to any single occupant of the vehicle, such as disabled persons parking authorizations. Therefore, a SW application downloaded to activate and begin communicating with the frame may be customized for or by the user.

At step 403, a user may connect to the smart frame device while online to register and or activate the short range network connection between the user's phone and the frame device. In one implementation, the provider of the SW application may broker or proxy transactions made between the user and third parties. Once the frame is registered and or activated at step 403, the user may access a service online offered by a third party and pay registration fees, purchase parking time, or engage in like transactions through that party that may be relevant to the vehicle at step 404. Information exchanged between the frame and a user's phone may be encrypted before transit and decrypted on board the device and on the phone. Similarly, any information online relative to the user frame that may be transferred to the frame device directly or by proxy may be encrypted at the server.

The third party service may as part of the transacting in step 404, confirm validity and send information for display to the user's phone received at step 405 or in one case directly to the frame device. The user may then transmit the data to the frame device over short range wireless network for appropriate EPD display. This occurs in step 406 wherein the user may wirelessly connect with the frame device and once connected may upload the received data to the frame for overwriting the old data at step 407. The process may end for the user at step 408. As data in display becomes obsolete the user may determine to discontinue the display of that data by overwriting with new data. The user may, in one embodiment where no subsequent information is to be displayed, erase any displayed data by uploading a mask image to replace the previous information.

Figure 5:
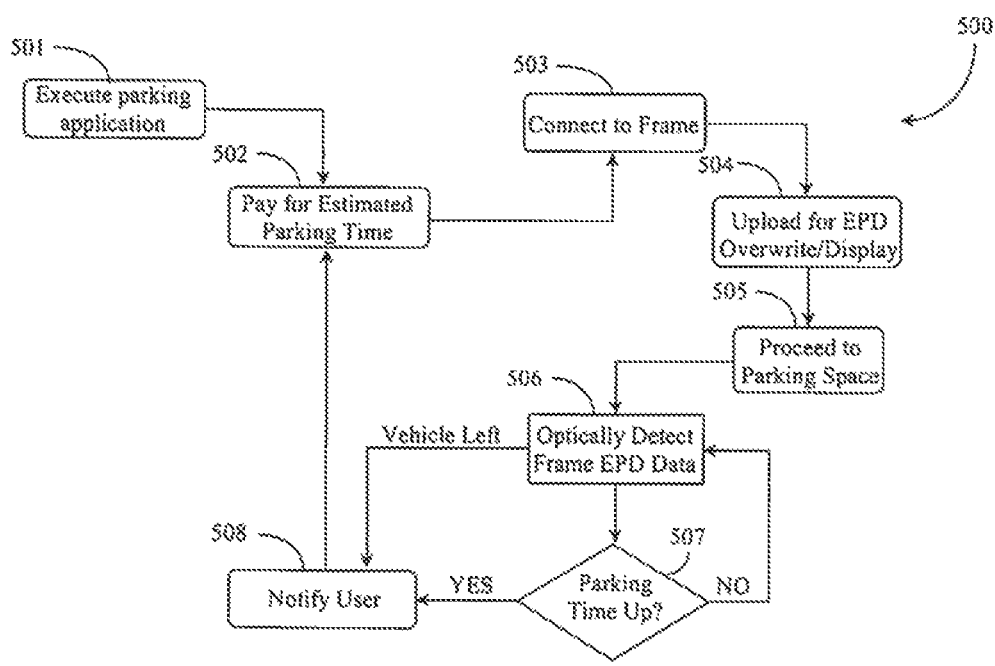
FIG. 5 is a process flow chart depicting steps for interacting with a parking application, reserving parking time and detecting valid parking information.

FIG. 5 is a process flow chart 500 depicting steps for interacting with a parking application, reserving parking time and detecting valid parking information. At step 501 a user may execute a parking application SW on a phone connected to the network. The execution thereof may bring up a parking service website or service location site. In this case the user is connected to a network server and transaction page for enabling transactions. At step 502, the user may conduct one or more transactions to prepay for estimated parking time including perhaps reservation of a parking space. Or the user may open an automated payment account with the parking service such that the service may debit that account periodically based on verification of frame reported GPS coordinates. In the transaction, a confirmation and data for display may be sent to the user at step 502 or directly to the frame as with an IoT device.

At step 503, the user may connect to a frame while still online and may transmit the validated parking information for display and overwrite of older data if need be at step 504. The user may then proceed to a parking space or an available parking space, if a particular space was not reserved, at step 505. Step 505 may include use of optical recognition of displayed information such as through a camera at a parking gate analogous to optical device 112 of Fig. in order to authorize the user and grant entry to the vehicle into the parking area. In another embodiment tracking is performed by reporting GPS At step 506 a camera provided to one or more parking spaces may optically detect presence of the authorized vehicle, and in one implementation may also be positioned to read frame data while the user's vehicle is parked. In a variation of this in place of a camera frame GPS coordinates may be reported to determine presence and the distance a vehicle is way from the parking site. At step 507 the parking service may determine if parking time is up and whether or not the vehicle is present based on GPS or close optical monitoring. If parking time is not expired and the vehicle is present the process may loop back to step 506 with an exception that if the vehicle is not present and the parking time is not expired, the process may skip to notification of the user at step 508 and the user may receive reimbursement for time purchased but not used.

At step 507, if the parking time is expired the system may notify the user at step 508 and offer additional time if the vehicle is still present. If the vehicle is not present when time expires the notification may have already been given to the user that a reimbursement might be available to the user. For open parking areas such as a lot, GPS data may be used to determine the presence or no of the vehicle instead of a camera or optical device. In some applications like camping reservation a vehicle may come and go during the time of the reservation so it may not be important to check the presence of the vehicle at any time during the stay, but checking the vehicle presence may be important toward the end of his or her allotted time.

In another embodiment, a service may charge block times and may not reimburse a user that leaves before expiration. In another application a user may set up an automatic debit account enabling the service to withdraw money for payment of additional authorized time. There are many possibilities. Processes somewhat similar to this process may be utilized in other scenarios such as sporting events, concerts, or open municipal areas where rules may be different for different days or depending upon local events.

Figure 6:
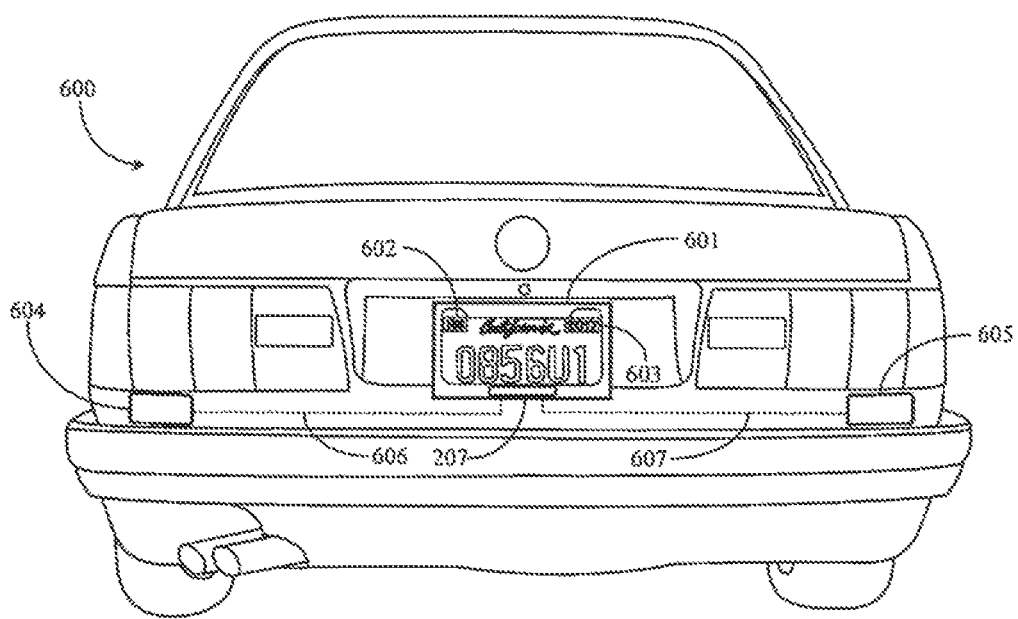
FIG. 6 is an elevation view of the rear of a vehicle supporting peripheral EPD displays according to an embodiment of the present invention.

FIG. 6 is an elevation view of the rear of a vehicle 600 supporting peripheral EPD displays according to an embodiment of the present invention. In one embodiment of the present invention, a manufactured smart frame as described so far herein may come with additional peripheral EPDs for displaying much more static information and in a location on the vehicle that is not inherent to the frame device. Vehicle 600 includes a smart frame 601 having at least two EPDs provided thereon from displaying current registration status information. These are EPDs 601 and EPDs 602. A third EPD module 207 is positioned at the bottom center portion of front frame 601. EPD 207 is an elongate display module that may be used to display electronic ink information such as the dealership where the owner purchased the vehicle. Other information may also be displayed that may overwrite the dealership logo data. In one implementation display 207 may be a single display that may be manipulated to create one or more data display windows wherein different information may be uploaded to frame 601 and then displayed in individual ones of those created windows, each window defining a boundary within which the data may be displayed.

In one embodiment, display 207 may be a dynamic display for content based on location (GPS) and time. If the vehicle is parked at a parking meter, the system could use display 207 to display information pertaining to the amount of time purchased or remaining. If the system recognizes through GPS or by user input that the vehicle is parked in a specific location requiring a specific authorization display such as the display of a handicap sticker, then display 207 may be used to display the handicap authorization information. The system can be programmed to recognize the context and display the appropriate content automatically and dynamically. The display, for example, could switch from time to authorization sticker every predetermined period. An example of this is when entry of the vehicle into a particular lot determined by GPS location causes the system to display the authorization sticker and/or time purchased for that particular lot. In other embodiments, the system may determine location by other means such as by camera mounted on the front of the vehicle sending information to the server which determines that a particular lot is being accessed and a particular type of authorization is required for display. The user may also access the system through mobile phone application to tell the system to display a particular authorization. In some embodiments one of the displays could also display the license plate number so that police or other authorities can determine that the Frame 601 is matched with the vehicle license. This would be helpful in making sure that the Frame 601 is displaying authorization information which correctly pertains to the vehicle license plate. In this way the system assists authorities in ensuring that the registration information being displayed pertains to the vehicle license plate. This is an improvement over current situations where there isn't any easy way for authorities to determine whether a set of registration tags have been stolen and placed on a different vehicle.

Frame 601 may be a passive display frame with a main frame at front or back of the vehicle. Frame 601 may also be the main frame fully capable of communications and display of downloaded information. Frame 601 may also take the form of displays and system hardware built into the manufactured vehicle such that the license plate is simply mounted to or displayed at a location adjacent to the frame 601 displays.

Vehicle 600 supports at least one peripheral EPD. In this view there are two EPDs mounted in a visible manner on the rear body of vehicle 600. These are an EPD 604 mounted approximately to the left rear body of the vehicle and EPD 605 mounted approximately to the right rear body of the vehicle. Selection of mounting location may be a matter of convenience such as where authorities may normally look for sticker or placard information. However other factors may be involved in determining the location of the display such as risk factors associated with mounting a display on a bumper which may be a likely place for a collision between two vehicles. Displays may be located on or within the exterior body of the vehicle in almost any location which would be easily visible to authorities or third parties looking from the outside of the vehicle. In one embodiment, a car manufacturer may provide EPD displays in a manner that they may be used if the owner purchases a frame system or not. For example, the manufacturer may provide displays on the body of the vehicle which may be later used in concert with the described system or which may function independently of the system described herein.

EPDs are typically encapsulated devices and at least to some extent must be protected from the elements. Therefore, EPDs 604 and 605 may be mounted on the inside surface of the car body with a cut out of the body sufficient for enabling display of the information. Gaskets or a rubber seat interface might be used to cushion the EPD device and protect the casing from the elements owing to the fact that the electronic components of the display device are not exposed to rain weather or extreme sun. An EPD peripheral device may be powered by an adjacent mounted solar panel or by another power source such as a car battery.

In this implementation there may be one, two or more than two peripheral displays that might have connection to a main or passive smart frame such as frames 105*a* and 105*b* described further above. EPD 604 may have a wire or cable connection to frame 601 such as a serial cable, a coaxial cable, a flex cable, a USB cable or a BUS path so that the address of the EPD is known to the main frame (CPU) and so that the frame may send data to the EPD for first time display or for overwrite of an existing data set displayed at the location. EPD 605 may be connected to frame by cable or wire 607 or it may communicate wirelessly to the main frame. In one respect the EPDs may be provided in manufacture of the car as a dealer's product. In another embodiment they may be peripherals that a user may mount using specific instructions for mounting.

The specific locations depicted here for the peripheral EPDs should not be construed as a limitation. These peripheral display devices may be mounted to or on or placed at any location within the vehicle and within communications range of a main frame on the vehicle by a user or by an original manufacturer. One reason for off frame display is that highly dynamic information may be displayed in special event-defined instances. Authorities may look to other locations on a vehicle besides a frame to look at temporary information such as a parking sticker, an event validation card, etc. Therefore, certain passive EPDs may be located in those places in a vehicle for convenience and to obfuscate the requirement for other types of stickers, placards, slips, or cards that might be visible to authorities monitoring compliance and validation states.

Figure 7:
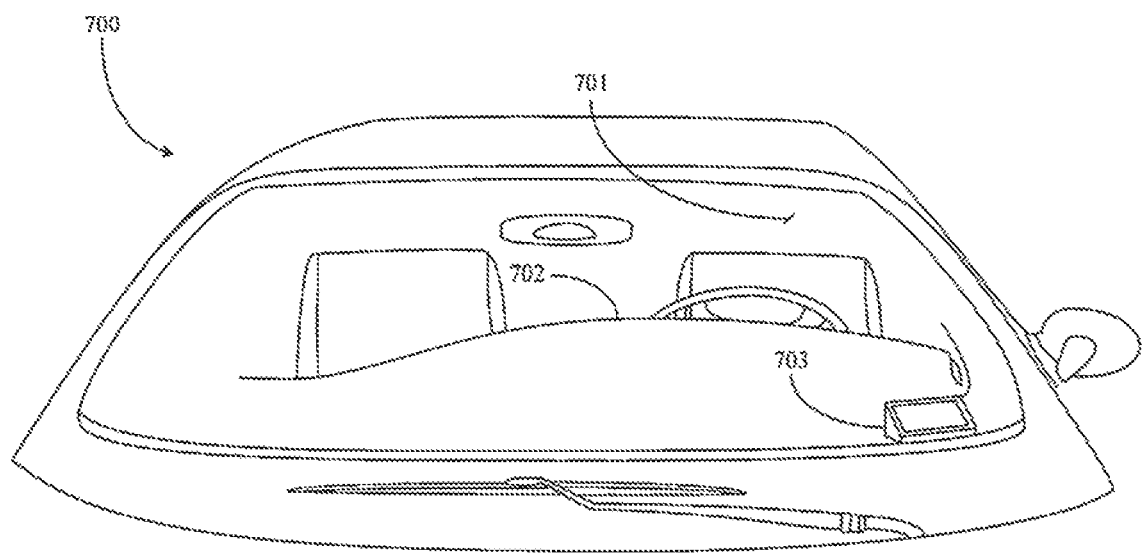
FIG. 7 is a partial view of the front of a vehicle supporting an angled EPD on a dashboard according to an embodiment of the present invention.

FIG. 7 is a partial view of the front of a vehicle 700 supporting an angled EPD on a dashboard according to an embodiment of the present invention. Vehicle 700 (partial view) is shown from the perspective of viewing through a windshield 701. A vehicle dashboard 702 is typically a logical place to put display information such as boating slips, camping spot validation, disabled placards (hung from rear view), parking garage slips, and other information that might be required for display to an authority or monitoring entity. In this implementation, an angularly adjustable EPD 703 is provided to rest on dashboard 702 at a location to display information such as may be viewable through windshield 701 when the vehicle is in a locked and parked state or when the vehicle is passing through a check point or over a border (State or Country).

EPD 703 may be an encapsulated EPD such as EPDs 604 and 605 of FIG. 6 above. In this example it is manufactured into an angularly adjustable body that may or may not be weighted to help stabilize it when resting on a dashboard. EPD 703 may also be removably or permanently installed by a user or an original manufacturer on dashboard 702 without departing from the spirit and scope of the present invention.

There is no limitation to the type or subject of data that might be displayed on EPD 703. In one embodiment, EPD 703 may be dedicated by the owner for display of information such as disabled placard state information that would be relatively static data that would remain in display at low power or no power when the vehicle is off and the main frame is asleep. It may instead be dedicated to display travel information such as hotel confirmation for certain parking or entry into certain areas, confirmation of prior purchase of tickets to a concert or movie, or any other information that might be verified at some point by an entity monitoring compliance.

EPD 703 may be a passive EPD that is connected to a passive or main smart frame by cable or wire or that has wireless communications capabilities and may be held in a mode such that it may be discovered and activated for display of information by the main frame. A user may adjust the height of the display and the angle of the display so that it is more easily viewed from the perspective of through the windshield for example. It is important to note herein that GPS and a timer in the main frame may be used to coordinate data displays and any notifications that may be sent out from or received by the main smart frame device.

Referring now back to FIG. 2. it is reminded that in one implementation display 207 may be a single display that may be manipulated to create one or more data display windows wherein different information (data sets) may be uploaded to frame 105 and then displayed in individual ones of created display windows, each window defining a boundary within which the data may be displayed. For example, EPD 207 may be configured for a two window display, the first window displaying a permit letter relative to parking permits and the second window indicating time already paid for the permit parking space. Time paid may be updated periodically to the main frame.

It may be pointed out the data might also be displayed off of the frame at another location on or in the vehicle. It may also be pointed out that other scenarios like for example displaying status of handicapped drivers in the first window and insured in the second window where those data are not exactly linked or relevant to the other is also permissible. In this embodiment a police officer may see a driver is handicapped otherwise limited in terms of authorized operation of the vehicle such as elderly drivers who might be limited to driving within certain geographical areas) and look up insured status of the driver stopped without getting out of the patrol car or asking the driver for proof of insurance, of course the EPD displaying the information would only be overwritten by an authorized authority like the DMV. In another scenario a first EPD window may display an amount of money due where the second window displays or notifies of a mobile toll collection and the amount of time estimated before its arrival to collect the monies. It is also noted herein that EPD 207 may be replaced with two independent EPD displays such as are depicted at the top of the frame. In one embodiment any monitoring authority such as a police officer or meter mate may, using a locally installed mobile application, issue a request to the frame server for information on authorized drivers of the vehicle including but not limited to identification information, licensing information, and insurance information. Further, the application may be such as an Amazon courier application or an equivalent enhanced with an application program interface enabling communication initiation with the frame server.

It will be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the if) scope of the invention.

The invention claimed is:

1. A system for electronically displaying data on a vehicle comprising:
   a server storing and executing an instance of software from a non-transient memory connected to a wide area network;
   at least one computerized license plate frame display device having one or more electronic displays, the device enabled to securely mount to the outside surface of a vehicle,
      the device having a controller and memory enabled to store and execute an instance of the software,
      the device enabled to communicate directly with the server via wireless transmission,
      the device having an electronic timer,
   wherein an owner of the vehicle initiates a transaction at the server resulting in the server transmitting data to the license plate frame display device,
   wherein upon receipt of the data from the server, the license plate frame display device initiates the timer and displays the data.

2. The system of claim 1, wherein the timer triggers a modification of the display after a specific time period.

3. The system of claim 2 wherein the timer is programmable.

4. The system of claim 1, wherein the server triggers a modification of the display after a specific time period.

5. The system of claim 1, wherein the owner implements a smart phone enabled to connect directly with the server initiating a second transaction causing the server to modify the display.

6. The system of claim 5, wherein upon the initiation of a second transaction the server reinitiates the timer.

7. The system of claim 1, wherein the server is part of any one of a governmental department that registers motor vehicles, a parking management system that transacts with a driver to reserve and manage parking spaces, an insurance provider that provides insurance services for a driver and motor vehicle.

8. The system of claim 7, wherein the data depicted on the display is any one of the vehicle registration of the motor vehicle in lieu of a license plate sticker, parking validation information, current insurance status.

9. The system of claim 1, wherein the license plate frame display device is part of a motor vehicle body.

10. The system of claim 1 having a replaceable battery.

11. A method of displaying data on a license plate frame display device including the steps of:
    (a) connecting a server storing and executing software from a non-transient memory connected to a wide area network and data depository;
    (b) providing at least one electronic display on the license plate frame display device having a controller and memory enabled to store and execute an instance of software, the device enabled to communicate directly with the server via wireless transmission, the device having an electronic timer;
    (c) an owner of the vehicle initiates a transaction at the server resulting in the server transmitting data to the license plate frame display device, and
    (d) upon receipt of the data from the server, the license plate frame display device initiates the timer and displays the data.

12. The method of claim 11, wherein the timer triggers a modification of the display after a specific time period.

13. The method of claim 12, wherein the timer is programmable.

14. The method of claim 11, wherein the server triggers a modification of the display after a specific time period.

15. The method of claim 11, wherein the owner implements a smart phone enabled to connect directly with the server initiating a second transaction causing the server to modify the display.

16. The method of claim 15, wherein upon the initiation of a second transaction the server reinitiates the timer.

17. The method of claim 11, wherein the server is a part of any one a governmental department that registers motor vehicles, a parking management system that transacts with a driver to reserve and manage parking spaces, an insurance provider that provides insurance services for a driver and motor vehicle.

18. The method of claim 17, wherein the data depicted on the at least one display is any one of vehicle registration of the motor vehicle in lieu of a license plate sticker, parking validation information, current insurance status.

19. The method of claim 11, wherein the license plate frame display device is integrated into the body of a motor vehicle.

20. The method of claim 11, wherein the license plate frame display device has a replaceable battery.

* * * * *